(12) United States Patent
Kakamu et al.

(10) Patent No.: US 6,832,974 B2
(45) Date of Patent: Dec. 21, 2004

(54) PLANETARY GEAR DEVICE FOR VEHICLE, HAVING CLUTCH DRUM PROVIDED WITH RETAINER RING

(75) Inventors: Michitaka Kakamu, Toyota (JP); Hideki Yasue, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/400,434

(22) Filed: Mar. 28, 2003

(65) Prior Publication Data

US 2003/0232693 A1 Dec. 18, 2003

(30) Foreign Application Priority Data

Jun. 14, 2002 (JP) ........................................ 2002-175109

(51) Int. Cl.[7] ................................................. F16H 3/44
(52) U.S. Cl. ....................................... 475/331; 475/146
(58) Field of Search ............................... 475/323, 326, 475/116, 331, 146; 192/85 AA, 3.52

(56) References Cited

U.S. PATENT DOCUMENTS

| | | | | |
|---|---|---|---|---|
| 2,583,556 A | * | 1/1952 | Gaston | ................... 192/85 AA |
| 2,984,122 A | * | 5/1961 | Woolley | ...................... 475/116 |
| 3,365,985 A | * | 1/1968 | Johnson | ....................... 475/146 |
| 4,467,669 A | * | 8/1984 | Kawamoto | .................... 475/116 |
| 4,714,146 A | * | 12/1987 | Moroto et al. | ........... 192/85 AA |
| 5,019,022 A | * | 5/1991 | Uhlig et al. | ................. 475/116 |
| 5,176,579 A | * | 1/1993 | Ohsono et al. | ................. 474/1 |
| 6,592,489 B2 | * | 7/2003 | Tajima et al. | ................ 475/323 |

FOREIGN PATENT DOCUMENTS

JP 2001-108076 4/2001

* cited by examiner

*Primary Examiner*—Sherry Estremsky
(74) *Attorney, Agent, or Firm*—Kenyon & Kenyon (57) ABSTRACT

A vehicle planetary gear device including a sun gear, a carrier, a ring gear, a clutch drum, clutch plates axially slidably fitted in the drum, a backing plate fixedly disposed in the drum on one side of a series of clutch plates, and a piston axially movable fitted in the drum and disposed on the other side of the series of clutch plates, and wherein the ring gear is fixedly fitted in the drum with its engaging teeth held in engagement with engaging grooves of the drum, and at least one retainer ring is fixed on the drum and disposed in contact with the teeth of one-piece member consisting of the ring gear and the backing plate, whereby axial movements of the backing plate and the ring gear relative to the drum are prevented by the at least one retainer ring.

9 Claims, 6 Drawing Sheets

PLANETARY GEAR DEVICE FOR VEHICLE, HAVING CLUTCH DRUM PROVIDED WITH RETAINER RING

This application is based on Japanese Patent Application No. 2002-175109, the contents of which are incorporated hereinto by reference.

BACKGROUND OF THE INVENTION

1. Field of the Invention

The present invention relates to improvements in a planetary gear device provided in a power transmitting system of an automotive vehicle, for transmitting a drive force produced by a drive power source.

2. Discussion of Related Art

A power transmitting system of an automotive vehicle may incorporate a planetary gear device including (a) a sun gear disposed rotatably about an axis thereof, which is an axis of the planetary gear device, (b) a ring gear disposed rotatably about an axis thereof concentric with the axis of the planetary gear device, (c) a carrier having a pinion pin parallel to the axis of the, planetary gear device and disposed rotatably about an axis thereof concentric with the axis of the planetary gear device, the pinion pin rotatably supporting a pinion such that the pinion is held in meshing engagement with the sun and ring gears, and (d) a clutch for connecting a selected one of the sun gear, ring gear and carrier to another rotary element. JP-A-2001-108076 discloses an example of the planetary gear device of the type described above. The planetary gear device functions to switch a direction of transmission of the drive power source between forward and reverse directions, and/or change the speed ratio of the power transmitting system.

Where the planetary gear device of the type described above is arranged such that the ring gear is connected through the clutch to another rotary element, for example, there are coaxially disposed: (i) a clutch drum having a plurality of engaging grooves formed in its inner circumferential surface and parallel to the axis of the planetary gear device; (ii) a plurality of friction members in the form of clutch plates fitted in the clutch drum such that the clutch plates are rotatable with the clutch drum and axially movable relative to the clutch drum, each of the clutch discs having a plurality of engaging teeth formed on its outer circumferential surface and held in engagement with the respective engaging grooves of the clutch drum; (iii) an abutting member in the form of a backing plate having a plurality of engaging teeth formed on its outer circumferential surface, fixed in the clutch drum at the engaging teeth thereof and disposed on one side of a series of the clutch plates such that the backing plate is rotatable with the clutch drum and abuttable on the nearest clutch plate; (iv) the above-indicated ring gear disposed adjacent to the backing plate, and having a plurality of engaging teeth formed on its outer circumferential surface and held in engagement with the engaging groove of the clutch drum; and (v) a piston slidably fitted in the clutch drum and disposed on the other side of the series of clutch plates such that the piston is axially movable relative to the clutch drum, to press the clutch place toward the backing plate. The above-indicated rotary element connected through the clutch to the ring gear is integrally fixed to an attaching member which is disposed coaxially with the clutch drum and which has a plurality of engaging grooves formed on its outer circumferential surface and parallel to the axis of the planetary gear device. A plurality of clutch discs in the form of annular members are fitted on the attaching member such that the clutch discs are rotatable with the attaching member and are axially movable relative to the attaching member, each of the clutch disc having a plurality of engaging teeth formed on its inner circumferential surface and held in engagement with the engaging grooves of the attaching member. The clutch plates and the clutch discs are arranged alternately in the axial direction. In this planetary gear device, the clutch drum and the piston cooperate to define a fluid chamber. When a pressurized fluid is delivered into the fluid chamber, the piston is axially moved to force the clutch plates and the clutch discs against each other and against the backing plate, so that the ring gear is mechanically connected to the above-indicated rotary element through the clutch plates and clutch discs which are held in pressing frictional contact with each other.

The clutch drum has three annular grooves formed in its inner circumferential surface in its circumferential direction, and three retainer rings (annular stop members) are fitted in the respective annular grooves such that the two retainer rings are disposed on the respective opposite sides of the ring gear while the third retainer ring is disposed on one side of the backing plate remote from the piston, and such that the retainer rings are almost radially aligned with the engaging teeth of the ring gear and the backing plate, which are disposed in the clutch drum such that the ring gear and backing plate are rotatable with the clutch drum. The retainer rings function to prevent the ring gear and backing plate from being axially moved relative to the clutch drum in the axial direction.

SUMMARY OF THE INVENTION

The present inventors have continued an extensive research for a long time in an effort to provide a planetary gear device for a vehicle, which is economical to manufacture. As a result of this research, the inventors have conceived an arrangement which permits reduction in the number of required components associated with the clutch which is provided to connect the ring gear and another rotary element to each other. The present invention was made in the light of the background art described above. It is an object of the present invention to provide a planetary gear device for a vehicle, which is simple in construction and economical to manufacture.

The object indicated above may be achieved according to any one of the following modes of the present invention in the form of a planetary gear device for an automotive vehicle, each of which is numbered like the appended claims and depends from the other mode or modes, where appropriate, for easier understanding of technical features disclosed in the present application, and possible combinations of those features. However, it is to be understood that the invention is not limited to those technical features or combinations thereof.

(1) A planetary gear device for an automotive vehicle, comprising (a) three rotary elements consisting of a sun gear, a carrier and a ring gear, (b) a clutch drum having a plurality of engaging grooves formed in its inner circumferential surface and parallel to its axial direction, (c) a plurality of friction members fitted in the clutch drum such that the friction members are rotatable with the clutch drum and axially movable relative to the clutch drum, each of the friction members having a plurality of engaging teeth formed on its outer circumferential surface and held in engagement with the respective engaging grooves of the clutch drum, (d) an abutting member having a plurality of engaging teeth formed on its outer circumferential surface, fixed in the clutch drum at the engaging teeth thereof and disposed on one side of a series of the friction members such that the abutting member is rotatable with the clutch drum and abuttable on a nearest one of the friction members, and (e) a piston slidably fitted in the clutch drum and disposed on the other side of the series of the friction members such that the piston is axially movable relative to the clutch drum, to press the friction members toward the abutting member, and wherein the ring gear has a plurality of engaging teeth formed on its outer circumferential surface, fixedly fitted in the clutch drum at the engaging teeth thereof such that the ring gear is rotatable with the clutch drum, the planetary gear device further comprising:

a first retainer ring and a second retainer ring which are fixed on the clutch drum, to prevent axial movements of the abutting member and the ring gear relative to the clutch drum, the first retainer ring being disposed between and in contact with the engaging teeth of the abutting member and the engaging teeth of the ring gear, while the second retainer ring being disposed on one side of a radially outer portion of the ring gear having its engaging teeth, which one side is remote from the piston, the second retainer ring being held in contact with the engaging teeth of the ring gear.

In the planetary gear device constructed according to the above mode (1) of the invention wherein the abutting member and the ring gear are disposed in the clutch drum, the axial movements of the abutting member and the ring gear relative to the clutch drum can be effectively prevented by the first and second retainer rings fixed on the clutch drum. The first retainer ring is disposed between the abutting member and the ring gear, in contact with the engaging teeth of the abutting member and the engaging teeth of the ring gear, while the second retainer ring is disposed on one side of the radially outer portion of the ring gear which has the engaging teeth, which one side is remote from the piston. The second retainer ring is held in contact with the engaging teeth of the ring gear. Thus, the abutting member and the ring gear are fixed on the clutch drum by only two retainer rings, that is, by the first and second retainer rings, such that the abutting member and the ring gear are not axially movable relative to the clutch drum. Accordingly, the present planetary gear device is simpler in construction and more economical to manufacture, with a smaller number of the required components, than the known planetary gear device which requires at least three retainer rings.

(2) A planetary gear device according to the above mode (1), wherein the first and second retainer ring are fixed on the inner circumferential surface of the clutch drum in which the plurality of engaging grooves are formed.

(3) A planetary gear device according to the above mode (1) or (2), wherein the above-indicated radially outer portion of the ring gear is an outwardly extending flange formed at one axial end of the ring gear which is adjacent to the abutting member.

(4) A planetary gear device for an automotive vehicle, comprising (a) three rotary elements consisting of a sun gear, a carrier and a ring gear, (b) a clutch drum having a plurality of engaging grooves formed in its inner circumferential surface and parallel to its axial direction, (c) a plurality of friction members fitted in the clutch drum such that the friction members are rotatable with the clutch drum and axially movable relative to the clutch drum, each of the friction members having a plurality of engaging teeth formed on its outer circumferential surface and held in engagement with the respective engaging grooves of the clutch drum, (d) an abutting member having a plurality of engaging teeth formed on its outer circumferential surface, fixed in the clutch drum at the engaging teeth thereof and disposed on one side of a series of the friction members such that the abutting member is rotatable with the clutch drum and abuttable on a nearest one of the friction members, and (e) a piston slidably fitted in the clutch drum and disposed on the other side of the series of the friction members such that the piston is axially movable relative to the clutch drum, to press the friction members toward the abutting member, and wherein the ring gear has a plurality of engaging teeth formed on its outer circumferential surface, fixedly fitted in the clutch drum at the engaging teeth thereof such that the ring gear is rotatable with the clutch drum, the planetary gear device being characterized in that:

the abutting member and the ring gear are formed integrally with each other, as a one-piece member; and at least one retainer ring is fixed on the clutch drum to prevent axial movements of the one-piece member relative to the clutch drum, the at least one retainer ring being disposed in contact with the engaging teeth of the abutting member and the ring gear.

In the planetary gear device constructed according to the above mode (4) of this invention, the abutting member and the ring gear disposed in the clutch drum are formed integrally with each other, as a one-piece member, and the axial movements of this one-piece member relative to the clutch drum can be effectively prevented by the at least one retainer ring which is disposed in contact with the engaging teeth of the abutting member and the ring gear. Thus, the abutting member and the ring gear that are formed as the one-piece member are fixed on the clutch drum by one retainer ring or two retainer rings, such that the abutting member and the ring gear are not axially movable relative to the clutch drum. Accordingly, the present planetary gear device is simpler in construction and more economical to manufacture, with a smaller number of the required components, than the known planetary gear device which requires at least three retainer rings.

(5) A planetary gear device according to the above mode (4), wherein the above-indicated at least one retainer ring is fixed on the inner circumferential surface of the clutch drum in which the plurality of engaging grooves are formed.

(6) A planetary gear device according to the above-indicated mode (4) or (5), wherein the ring gear has an outwardly extending flange formed at one axial end thereof on the side of the clutch drum, and the abutting member is formed integrally with the outwardly extending flange such that the abutting member is spaced apart from the outwardly extending flange in an axial direction of the clutch drum. In this case, the at least one retainer ring consists of a single retainer ring interposed between the outwardly extending flange and the abutting member.

(7) A planetary gear device according to the above mode (4), wherein the one-piece member has a plurality of common engaging teeth which function as the engaging teeth of the abutting member and the engaging teeth of the ring gear, and the above-indicated at least one retainer ring includes a retainer ring which is disposed on one side of a radially outer portion of the one-piece member which has the common engaging teeth. The above-indicated one side is remote from the piston.

(8) A planetary gear device according to the above mode (7), wherein the clutch drum includes a first axial portion having an inner circumferential surface in which the engaging grooves are formed as first engaging grooves, and a second axial portion having an inner circumferential surface in which a plurality of second engaging grooves are formed, and the common engaging teeth are held in engagement with the second engaging grooves.

(9) A planetary gear device according to the above mode (8), wherein the second axial portion has a larger diameter than the first axial portion and is located on one side of the first axial portion which is remote from the piston, and the first and second axial portions cooperate with each other to define a shoulder surface. In this case, the above-indicated one retainer ring consists of a single retainer ring disposed on the above-indicated one side of the radially outer portion of the one-piece member, and the common engaging teeth are held in abutting contact with the shoulder surface.

(10) A planetary gear device according to the above mode (8), wherein the first and second axial portions have a same diameter, and the second axial portion is located on one side of the first axial portion which is remote from the piston. In this case, the one-piece member has a plurality of second engaging teeth formed such that the common engaging teeth and the second engaging teeth are arranged alternately in a circumferential direction of the one-piece member, and the second axial portion has a plurality of cutouts formed such that the second engaging teeth are held in engagement with the respective cutouts. Further, the first axial portion has axial end faces which are exposed to the respective cutouts and which provide abutting faces. In this case, the above-indicated least one retainer ring consists of a single retainer ring disposed on the above-indicated one side of the radially outer portion of the one-piece member, and the second engaging teeth are held in abutting contact with the abutting faces of the first axial portion of the clutch drum.

(11) A platen device according to the above mode (7), wherein the above-indicated at least one retainer ring consists of the retainer ring disposed on the above-indicated one side of the radially outer portion of the one-piece member, and an auxiliary stop member fixedly disposed on the other side of the radially outer portion of the one-piece member.

BRIEF DESCRIPTION OF THE INVENTION

The above and other objects, features, advantages and technical and industrial significance of the present invention will be better understood by reading the following detailed description of preferred embodiments of the invention, when considered in connection with the accompanying drawings, in which.

DESCRIPTION OF THE PREFERRED EMBODIMENT

Figure 1:
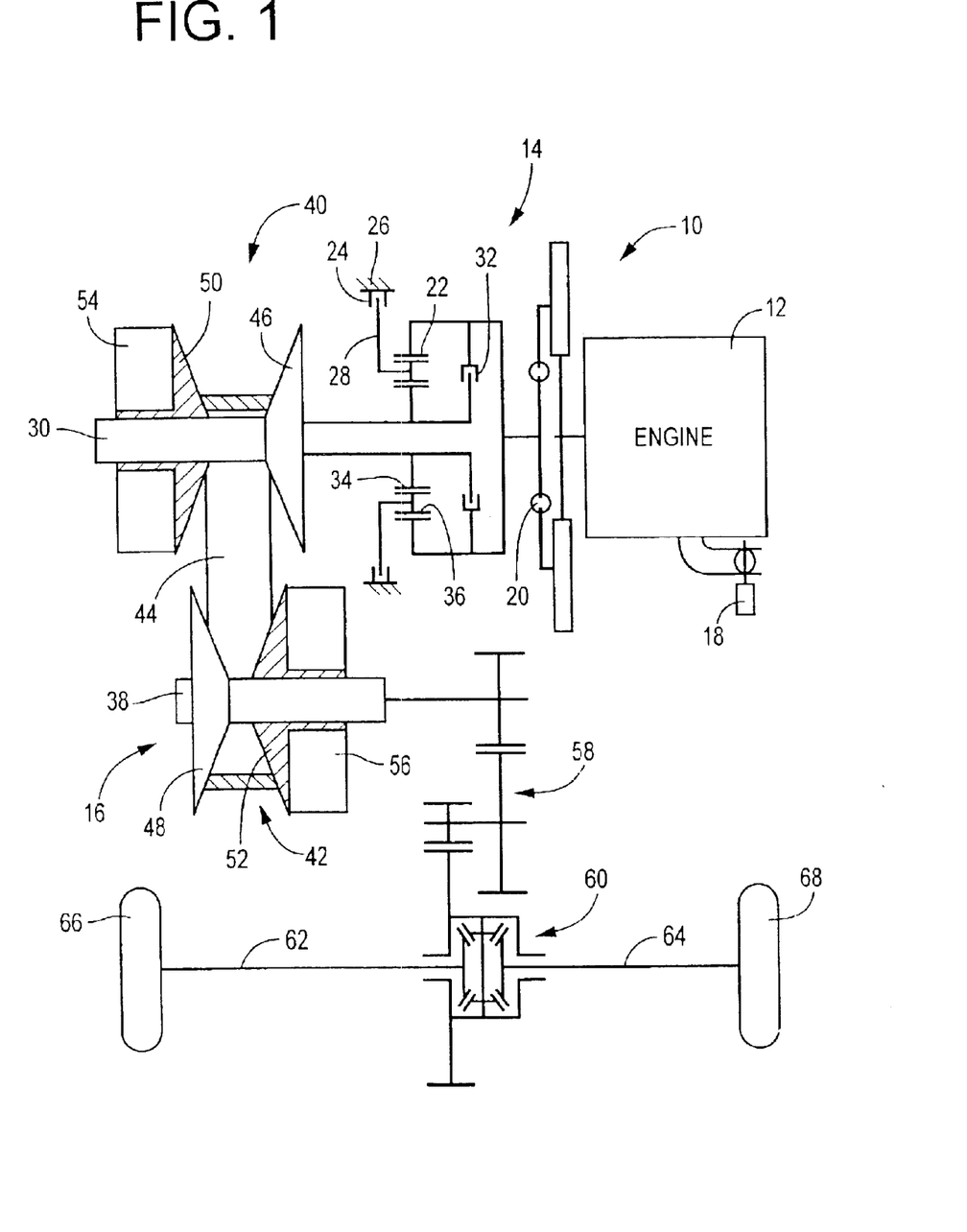
FIG. 1 is a schematic view showing a power transmitting system of a front-drive automotive vehicle, which incorporates a planetary gear device constructed according to the principle of this invention.

Referring first to the schematic view of FIG. 1, the power transmitting system of the front-drive automotive vehicle includes a front-wheel drive device 10 arranged to drive front drive wheels 66, 68 of the vehicle. The front-wheel drive device 10 includes an internal combustion engine 12, a planetary gear device (which will be described by reference to FIGS. 2–7), and a continuously variable transmission 16, which are disposed coaxially with each other. The engine 12 is operable by combustion of an air-fuel mixture consisting of air and a fuel, and the planetary gear device is operatively connected to the engine 12 and the continuously variable transmission 16. The continuously variable transmission 16 is controlled to continuously change its speed ratio. The engine 12 is provided with a throttle actuator 18 operable to control an angle of opening of a throttle valve, which is provided to regulate a rate of flow of the air into the engine 12 through an intake pipe.

Figure 2:
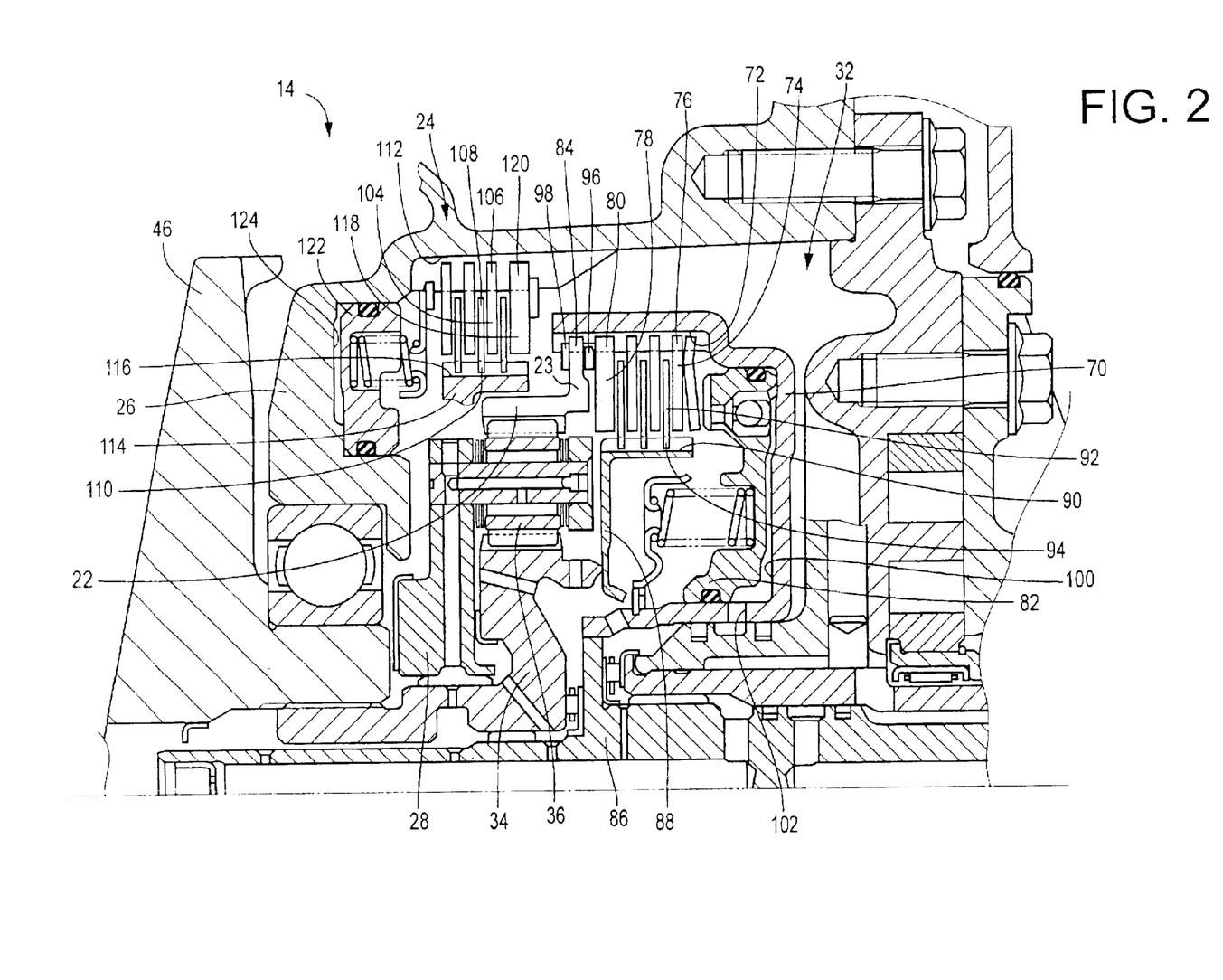
FIG. 2 is an elevational view in axial cross section of a planetary gear device according to a first embodiment of this invention.

Referring next to the cross sectional view of FIG. 2, there is shown the planetary gear device 14 constructed according to a first embodiment of this invention. As shown in FIG. 2, this planetary gear device 14 includes three rotary elements disposed coaxially with each other such that these rotary elements are rotatable independently of each other, about a common axis, that is, about an axis of the planetary gear device 14. Namely, the planetary gear device 14 includes a ring gear 22 connected through a damper device 20 to the engine 12, a carrier 28 selectively fixed through a brake 24 to a stationary member in the form of a housing 26 of the planetary gear device 14, and a sun gear 34 which is connected to an input shaft 30 of the continuously variable transmission 30 and which is selectively connected through a clutch 32 to the ring gear 22 described above. The carrier 28 carries a pinion (planetary gear) 36 which meshes with the ring gear 22 and the sun gear 34 and which is rotatable about its axis parallel to the above-indicated common axis.

As is apparent from the schematic view of FIG. 1, the planetary gear device 14 has two operating states, that is, a first operating state in which the brake 24 is released while the clutch 32 is engaged, and a second operating state in which the brake 24 is engaged while the clutch 32 is released. The brake 24 and the clutch 32 are hydraulically operated. The direction of rotation of the input shaft 30 of the continuously variable transmission 16 when the engine 12 is operated in a predetermined direction is switched between a forward-drive direction and a reverse-drive direction for respective forward and reverse runs of the vehicle, when the planetary gear device 14 is switched between the first and second operating states. Thus, the planetary gear device 14 functions as a forward/reverse switching device which is arranged to selectively drive the vehicle in the forward and reverse directions, with the brake 24 and the clutch 32 being selectively engaged and released by a suitable hydraulic control circuit.

The continuously variable transmission 16 is provided with a pair of variable-diameter pulleys 40, 42, and an endless transmission belt 44 connecting the two variable-diameter pulleys 40, 42. The variable-diameter pulleys 40, 42 are mounted on the above-indicated input shaft 30 and an output shaft 38 of the transmission 16, respectively, and are adapted to have variable effective diameters. The variable-diameter pulleys 40, 42 have respective stationary rotary members 46, 48 fixed on the respective input and output shafts 30, 38, and respective axially movable rotary members 50, 52 which are mounted on the respective input and output shafts 30, 38 such that the axially movable rotary members 50, 52 cooperate with the respective stationary rotary members 46, 48 to define V-grooves, and are axially movable relative to and rotatable with the respective input and output shafts 30, 38. The continuously variable transmission 16 is further provided with a pair of hydraulic cylinders 54, 56 to apply axial thrust forces to the axially movable rotary members 50, 52, for thereby changing the effective diameters of the variable-diameter pulleys 40, 42, to control the speed ratio of the transmission 16, which is a ratio of the rotating speed of the input shaft 30 to the rotating speed of the output shaft 38.

A drive torque generated by the output shaft 38 of the continuously variable transmission 16 is transmitted to the front drive wheels 66, 68 of the vehicle through a speed reduction gear device 58, a differential gear device 60 and a pair of axles 62, 64. While the vehicle having this power transmitting system is provided with a steering device for controlling the steering angle of the front wheels 66, 68, the steering device is not shown in FIG. 1.

As shown in detail in FIG. 2, the clutch 32 for connecting ring gear 22 and the sun gear 34 includes a clutch drum 70, a plurality of friction members in the form of three clutch plates 74, an abutting member in the form of a backing plate 78 and a piston 82, which are disposed coaxially with each other. The clutch drum 70 has a plurality of engaging grooves 72 formed in its inner circumferential surface and parallel to its axial direction, such that the parallel engaging grooves 72 are equally spaced apart from each other in the circumferential direction of the clutch drum 70. The clutch plates 74 are fitted in the clutch drum 70 such that the clutch plates 74 are rotatable with the clutch drum 70 and axially movable relative to the clutch drum 70. Each of the clutch plates 74 has a plurality of engaging teeth 76 formed on its outer circumferential surface and held in engagement with the respective engaging grooves 72 of the clutch drum 70. The backing plate 78 has a plurality of engaging teeth 80 formed on its outer circumferential surface. The backing plate 78 is fixed in the clutch drum 70 with its engaging teeth 80 held in engagement with the respective engaging grooves 72, and is disposed on one side of a series of the clutch plates 74 remote from the piston 82, such that the backing plate 78 is rotatable with the clutch drum 70 and abuttable on the adjacent or nearest one of the clutch plates 74. Described more precisely, one of three clutch discs 92 (which will be described) adjacent to the backing plate 78 is abuttable on the backing plate 78 when the clutch 32 is engaged. The piston 82 is slidably fitted in the clutch drum and disposed on the other side of the series of the clutch plates 74, such that the piston 82 is axially movable relative to the clutch drum 70, to press or force the clutch plates 74 toward the backing plate 78. The ring gear 22 has a radially outer portion in the form of an outwardly extending flange 23 formed at one axial end of the cylindrical body portion, which one axial end is adjacent to the backing plate 78. The outwardly extending flange 23 has a plurality of engaging teeth 84 formed on its outer circumferential surface. The ring gear 22 is fixedly fitted in the clutch drum 70 with its engaging teeth 84 held in engagement with the respective engaging grooves 72 of the clutch drum 70, such that the ring gear 22 is rotatable with the clutch drum 70. The clutch drum 70 is fixed by welding or any other fixing means to a shaft 86, which is connected to the engine 12 through the damper device 20, so that the clutch drum 70 is rotatable with the shaft 86. The sun gear 34 has a radially inner annular portion fixedly fitted in a radially central portion of the stationary rotary member 46 of the variable-diameter pulley 40, such that the sun gear 34 is rotatable with the stationary rotary member 46.

To the sun gear 34, there is fixed by welding an annular attaching member 88 such that the attaching member 88 is coaxial with the clutch drum 70. The attaching member 88 has a plurality of engaging grooves 90 formed in its outer circumferential surface and parallel to its axial direction. A plurality of annular members in the form of the above-indicated clutch discs 92 are coaxially fitted on the attaching member 88 such that the attaching member 88 is rotatable with the attaching member 88 and are axially movable relative to the attaching member 88. Each of the clutch discs 92 has a plurality of engaging teeth 94 formed on its inner circumferential surface and held in engagement with the respective engaging grooves 90. The clutch discs 92 and the clutch plates 74 are arranged alternately in the axial direction of the planetary gear device 14.

To prevent axial movements of the ring gear 22 and the backing plate 78 relative to the clutch drum 70, the clutch drum 70 is provided with a first retainer ring in the form of a first snap ring 96 and a second retainer ring in the form of a second snap ring 98. The first and second snap rings 96, 98 are fixed on the inner circumferential surface of the clutch drum 70 such that the first snap ring 96 is disposed between and in contact with the engaging teeth 80 of the backing plate 78 and the engaging teeth 84 of the ring gear 22, while the second snap ring 98 is disposed on one side of the outwardly extending flange 23 of the ring gear 22, which one side is remote from the piston 82. The second snap ring 98 is held in contact with the engaging teeth 84 of the ring gear 22. Each of these first and second snap rings 96, 98 has one radial slit formed at a selected circumferential position, but is formed to maintain a substantially constant annular shape in cross section taken in a plane perpendicular to the axis of the clutch drum 70. The clutch drum 70 has two annular grooves formed in its inner circumferential surface in the circumferential direction, such that the two annular grooves are spaced apart from each other in the axial direction by a distance substantially equal to the axial dimension of the outwardly extending flange 23 of the ring gear 22. The first and second snap rings 96, 98 are fixedly fitted in the respective annular grooves, such that the snap rings 96, 98 are not movable in the axial direction.

In the planetary gear device 14 constructed as described above according to the first embodiment of the invention, the axial movements of the ring gear 22 relative to the clutch drum 70 are prevented by the first and second snap rings 96, 98, while the axial movement of the backing plate 78 relative to the clutch drum 70 is prevented by the first snap ring 96. Thus, the first snap ring 96 which is held in contact with the engaging teeth 80 of the backing plate 78 and the engaging teeth 84 of the ring gear 22 functions as a retainer ring for preventing the axial movements of both of the ring gear 22 and the backing plate 78 relative to the clutch drum 70.

In the clutch 32, the clutch drum 70 and the piston 82 cooperate to define a fluid chamber 100 communicating with a fluid passage 102. When a pressurized fluid is delivered into the fluid chamber 100 through the fluid passage 102, the piston 82 is advanced in the axial direction, to press the clutch plates 74 and the clutch discs 92 toward the backing plate 78, so that the clutch plates 74 and the clutch discs 92 are forced against each other between the piston 82 and the backing plate 78, whereby the ring gear 22 and the sun gear 34 are connected to each other, with friction forces generated by and between the clutch plates 74 and the clutch discs 92.

The brake 24 is provided with a plurality of friction members in the form of three brake plates 104 supported by the housing 26, and three brake discs 108 supported by an annular attaching member 114 fixed to the carrier 28. The brake plates 104 and the brake discs 108 are arranged alternately in the axial direction. Each of the brake plates 104 has a plurality of engaging teeth 106 formed on its outer circumferential surface, while a stationary member in the form of the housing 26 has a plurality of engaging grooves 112 formed in its inner circumferential surface. The brake plates 104 are fitted in the housing 26 such that the brake plates 104 are rotatable with the housing 26 and axially movable relative to the housing 26, with the engaging teeth 106 held in engagement with the respective engaging grooves 112. On the other hand, each of the brake discs 108 has a plurality of engaging teeth 110 formed on its inner circumferential surface, while the attaching member 114 has a plurality of engaging grooves 116 formed in its outer circumferential surface. The brake discs 108 are fitted on the attaching member 114 such that the brake discs 108 are rotatable with the attaching member 114 and are axially movable relative to the attaching member 114, with the engaging teeth 110 held in engagement with the respective engaging grooves 116. The brake 24 is further provided with a backing plate 118 disposed on one side of a series of the brake plates 104, and a brake piston 122 disposed on the other side of the series of the brake plates 104. The backing plate 118 has a plurality of engaging teeth 120 formed on its outer circumferential surface, and is fitted in the housing 26 such that the backing plate 118 is rotatable with the housing 26, with the engaging teeth 120 held in engagement with the engaging grooves 112. The brake disc 108 nearest to the backing plate 118 is abuttable on the backing plate 118. The brake piston 122 is arranged to press the brake plates 104 and the brake discs 108 toward the backing plate 118 so that the brake plates 104 and the brake discs 108 are forced against each other between the brake piston 122 and the backing plate 118.

In the brake 24, the housing 26 and the brake piston 122 cooperate to define a fluid chamber 124. When a pressurized fluid is delivered into the fluid chamber 124 through a fluid passage (not shown) formed through the housing 26, the brake piston 122 is advanced in the axial direction to press the brake plates 104 and the brake discs 108 against each other between the backing plate 118 and the brake piston 122, so that the carrier 28 is fixed to the housing 26 through friction forces generated by and between the brake plates 104 and the brake discs 108.

In the present planetary gear device 14, the abutting member in the form of the backing plate 78 and the ring gear 22 which are fitted in the clutch drum 70 are prevented from being moved relative to the clutch drum 70 in the axial direction, by the first and second retainer rings in the form of the first and second snap rings 96, 98 fixed on the clutch drum 70 such that the first snap ring 96 is disposed between and in contact with the engaging teeth 80 of the backing plate 78 and the engaging teeth 84 of the ring gear 22, while the second snap ring 96 is disposed on one side of the flange 23 of the ring gear 22 remote from the piston 82, and held in contact with the engaging teeth 84 of the ring gear 22. The backing plate 78 and the ring gear 22 are fixed in their axial positions by those two snap rings 96, 98. In the conventional planetary gear device, at least three retainer rings are required to prevent the axial movements of the ring gear and the abutting member. Thus, the present planetary gear device 14 is simpler in construction and more economical to manufacture, with a smaller number of the required components, than the conventional planetary gear device. In addition, the present planetary gear device 14 can be assembled in a comparatively shorter time.

The present planetary gear device 14 has a further advantage that the required axial length can be made shorter than in the conventional planetary gear device, owing to the arrangement wherein the ring gear 22 and the abutting member in the form of the backing plate 78 are located comparatively close to each other.

Referring next to the cross sectional view of FIG. 3, there will be described a second embodiment of the present invention. In the following description, the same reference numerals as used in the first embodiment will be used to identify the functionally corresponding elements, which will not be described redundantly.

Figure 3:
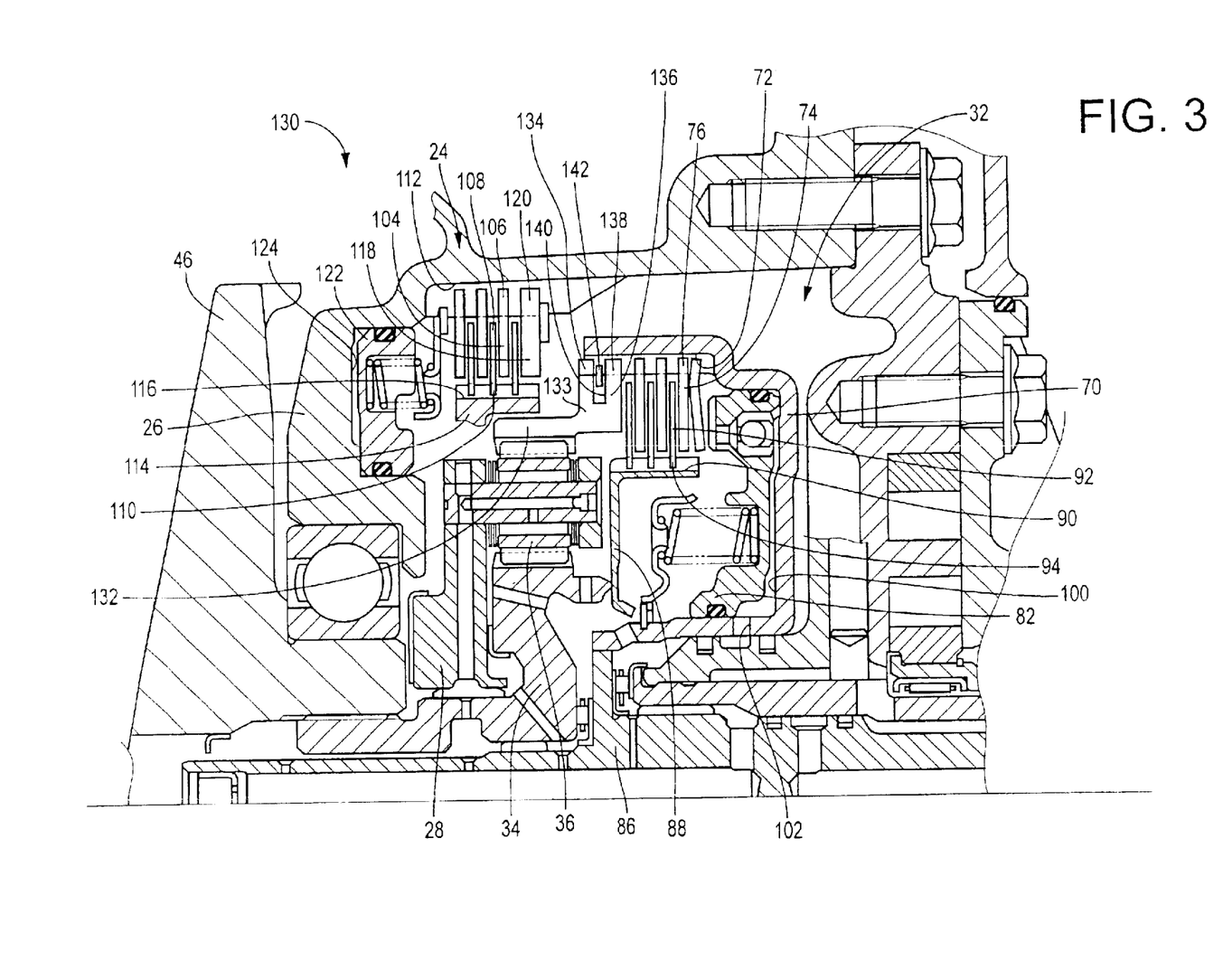
FIG. 3 is an elevational view in axial cross section of a planetary gear device according to a second embodiment of the invention.

A planetary gear device 130 constructed according to the second embodiment shown in FIG. 3 uses a one-piece member which provides a ring gear 132 and a backing plate 136. Described more specifically, the ring gear 132 has an outwardly extending flange 133 formed at one axial end of its cylindrical body portion on the side of the clutch drum 70. The backing plate 136 is formed integrally with the outwardly extending flange 133 of the ring gear 132 such that the backing plate 136 is spaced apart from the flange 133 in the axial direction of the clutch drum 70 and such that the backing plate 136 and the flange 133 cooperate to define therebetween an annular groove 140 formed in the circumferential direction of the flange 133. The flange 133 has a plurality of engaging teeth 134 formed on its outer circumferential surface, while the backing plate 136 has a plurality of engaging teeth 138 formed on its outer circumferential surface. The flange 133 and the backing plate 136 of the one-piece member are fitted in the clutch drum 70 such that the one-piece member is rotatable with the clutch drum 70, with the engaging teeth 134, 138 held in engagement with the engaging grooves 72 formed in the circumferential surface of the clutch drum 70 as described above. To prevent axial movements of the one-piece member (namely, the ring gear 132 and the backing plate 136) relative to the clutch drum 70, a retainer ring in the form of a snap ring 142 is fixedly fitted in the annular groove 140 such that the snap ring 142 is disposed in contact with the engaging teeth 134 of the ring gear 132 and the engaging teeth 138 of the backing plate 136.

In the planetary gear device 130 constructed according to the second embodiment, the ring gear 132 and the abutting member in the form of the backing plate 136 which are fitted in the clutch drum 70 are formed integrally with each other, as a one-piece member, and axial movements of this one-piece member is prevented by the retainer ring in the form of the snap ring 142 which is disposed in contact with the engaging teeth 134, 138 of the ring gear 132 and backing plate 136. Thus, the one-piece member functioning as the ring gear 132 and the backing plate 136 is fixed in the axial direction by the single snap ring 142. Thus, the present planetary gear device 130 is simpler in construction and more economical to manufacture, with a smaller number of the required components, than the conventional planetary gear device using at least three retainer rings. In addition, the present planetary gear device 130 can be assembled in a comparatively shorter time.

Figure 4:
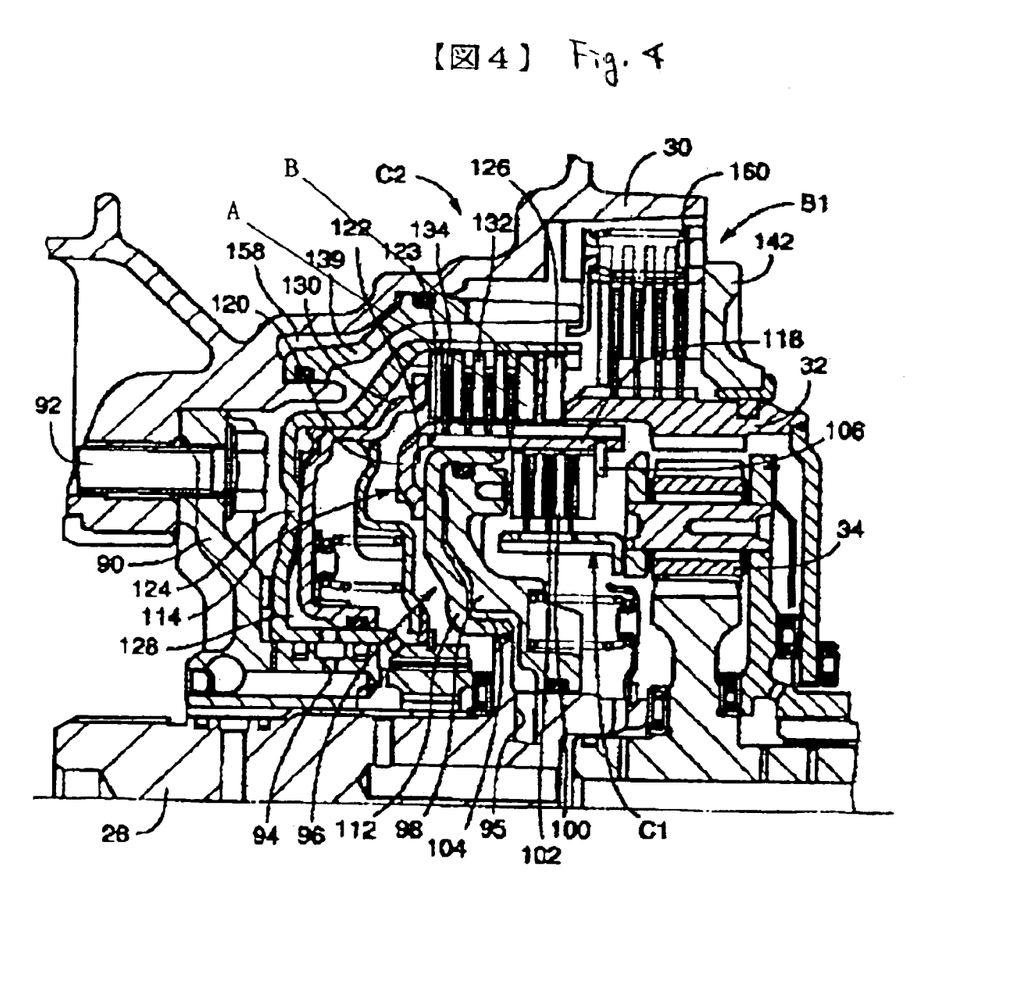
FIG. 4 is an elevational view in axial cross section of a planetary gear device according to a third embodiment of the invention.

Reference is now made to the cross sectional view of FIG. 4, there will be described a planetary gear device 150 constructed according to a third embodiment of this invention. As is apparent from FIG. 4, the planetary gear device 150 employs a one-piece member which provides a ring gear 152 and an abutting member 154. Described more specifically, the ring gear 152 has an outwardly extending flange or abutting portion 154 formed at one axial end of the cylindrical body portion, which one axial end is located on the side of the piston 82. The flange or abutting portion 154 functions as the abutting member which cooperates with the piston 82 to force the clutch plates 74 and the clutch discs 92 against each other. The flange 154 has a plurality of common engaging teeth 156 formed on its outer circumferential surface. The one-piece member functioning as the abutting member 154 and the ring gear 152 is fixed fitted in the clutch drum 70 such that the one-piece member is rotatable with the clutch drum 70, with the common engaging teeth 156 held in engagement with the engaging grooves 72 formed in the inner circumferential surface of the clutch drum 70. To prevent axial movements of the one-piece member 152, 154 relative to the clutch drum 70, a retainer ring in the form of a snap ring 158 is disposed on one side of the outwardly extending flange 154 remote from the piston 82, and in contact with the common engaging teeth 156 of the flange 154, while an auxiliary stop member in the form of a wire ring 159 is disposed on the other side of the flange 154 and in contact with the common engaging teeth 156.

In the planetary gear device 150 constructed according to the third embodiment of this invention, the ring gear 152 and the abutting member in the form of the outwardly extending flange or abutting portion 154 are provided by a single one-piece member having the common engaging teeth 156, and the retainer ring in the form of the snap ring 158 is disposed on one side of the flange 154 having the common engaging teeth 156, which one side is remote from the piston 82. The snap ring 158 is effective to prevents the one-piece member functioning as the ring gear 152 and the abutting member 154, from moving relative to the clutch drum 70 in the axial direction.

The planetary gear device 150 is further advantageous in that the required axial dimension can be minimized, owing to the arrangement wherein the ring gear 152 and the abutting member 154 are located close to each other.

Referring to the cross sectional views of FIGS. 5 and 6, there will be described a planetary gear device 160 constructed according to a fourth embodiment of this invention and a planetary gear device 180 according to a fifth embodiment of the invention. In these planetary gear devices 160, 180, the ring gear and the abutting member are formed integrally with each other, as a one-piece member, as in the third embodiment of FIG. 4. Described more specifically, the planetary gear devices 160, 180 are provided with respective ring gears 162, 182 which have respective outwardly extending flanges or abutting portions 164, 184 each formed at one axial end of the cylindrical body portion on the side of the piston 82. The flanges or abutting portions 164, 184 function as the abutting member which cooperates with the piston 82 to force the clutch plates 74 and the clutch discs 92 against each other. The flange 164 has a plurality of common engaging teeth 166 formed on its outer circumferential surface, while the flange 184 has a plurality of common engaging teeth in the form of small engaging teeth 186 formed on its outer circumferential surface, and a plurality of second engaging teeth in the form of large engaging teeth 188. As shown in FIG. 7, the small engaging teeth 186 are and the large engaging teeth 188 which are arranged alternately in the circumferential direction of the flange 184 (of the one-piece member 182, 184), and the large engaging teeth 188 have a slightly larger radial dimension than the small engaging teeth 186, and a circumferential dimension two times that of the small engaging teeth 186.

Figure 5:
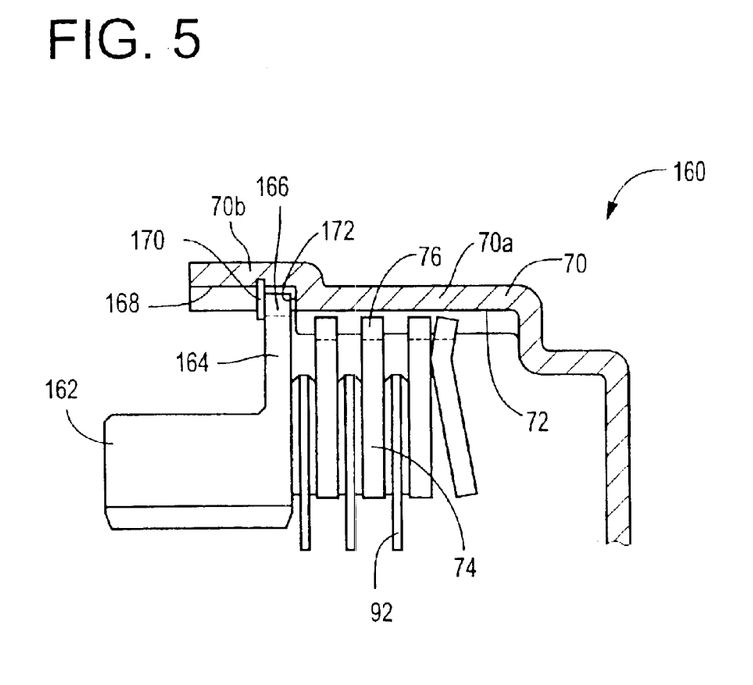
FIG. 5 is a fragmentary elevational view in axial cross section of a planetary gear device according to a fourth embodiment of the invention.

In the planetary gear device 160 of FIG. 5, the clutch drum 70 has a first axial portion 70a, and a second axial portion 70b which is located on one side of the first axial portion 70a remote from the piston 82 and which has a larger diameter than the first axial portion 70a. The first axial portion 70a has an inner circumferential surface in which the engaging grooves 72 are formed as first engaging grooves, while the second axial portion 70b has an inner circumferential surface which has a larger diameter than that of the first axial portion 70a. A plurality of second engaging grooves 168 are formed in the inner circumferential surface of the second axial portion 70b such that the grooves 168 extend in the axial direction of the second axial portion 70b. The engaging teeth 166 formed on the outer circumferential surface of the outwardly extending flange or abutting portion 164 are held in engagement with the respective second engaging grooves 168. The number of the second engaging grooves 168 is smaller than that of the engaging grooves 72, and the second engaging grooves 160 have a larger circumferential dimension than the engaging grooves 72. The first and second axial portions 70a, 70b cooperate to define a shoulder surface 172.

To prevent axial movements of the one-piece member 162, 164 relative to the clutch drum 70, a retainer ring in the form of a snap ring 170 is fixed on the inner circumferential surface of the second axial portion 70b, such that the snap ring 170 is held in contact with the common engaging teeth 166 formed on the flange 164. Further, the common engaging teeth 166 are held in abutting contact with the shoulder surface 172.

Figure 6:
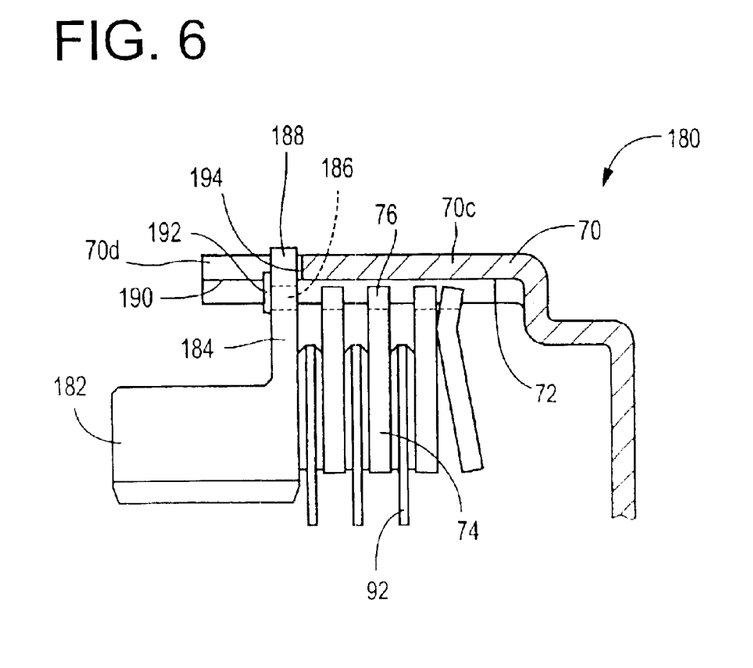
FIG. 6 is a fragmentary elevational view in axial cross section of a planetary gear device according to a fifth embodiment of the invention.
Figure 7:
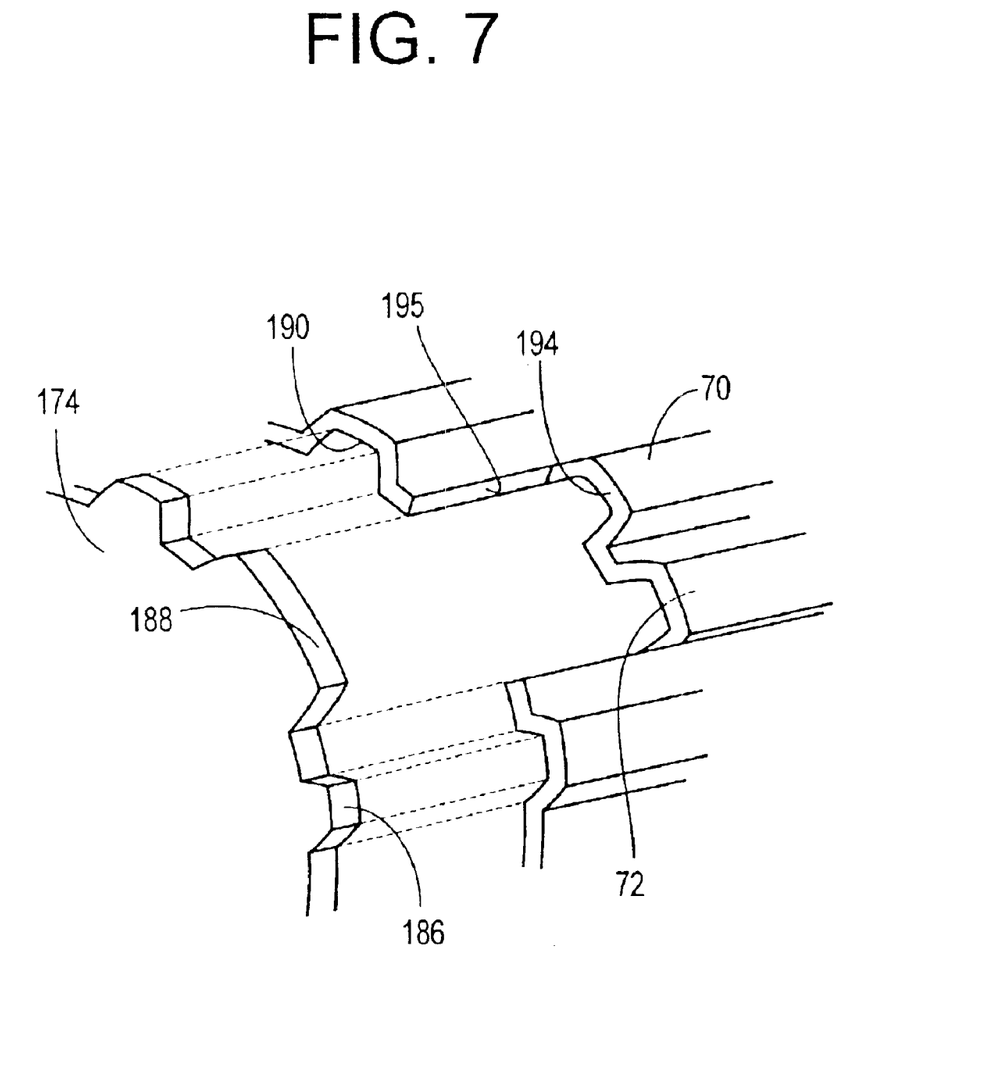
FIG. 7 is a perspective view for explaining engagement a ring gear with a clutch drum in the planetary gear device of FIG. 6.

In the planetary gear device 180 of FIG. 6, the clutch drum 70 has a first axial portion 70c, and a second axial portion 70d which is located on one side of the first axial portion 70c remote from the piston 82 and which has the same diameter than the first axial portion 70c. The first axial portion 70c has an inner circumferential surface in which the engaging grooves 72 are formed as first engaging grooves, while the second axial portion 70d has an inner circumferential surface in which a plurality of second engaging grooves 190 are formed for engagement with the respective common engaging teeth 186 formed on the outer circumferential surface of the outwardly extending flange or abutting portion 184. As shown in FIG. 7, the second axial portion 70d has a plurality of cutouts 195 formed such that the second engaging teeth 188 are held in engagement with the respective cutouts 195. The first axial portion 70c has axial end faces 194 which are exposed to the respective cutouts 195 and which provide abutting faces. A function of these abutting faces 194 will be described below.

To prevent axial movements of the one-piece member 182, 184 relative to the clutch drum 70, a retainer ring in the form of a snap ring 192 is fixed on the inner circumferential surface of the second axial portion 70d, such that the snap ring 192 is held in contact with the common engaging teeth 186 and the second engaging teeth 188 formed on the flange 184. Further, the second engaging teeth 188 are held in abutting contact with the abutting faces 194 of the first axial portion 70c of the clutch drum 70.

In the planetary gear devices 160, 180 according to the fourth and fifth embodiments of this invention, the common engaging teeth 166, 186 of the flange 164, 184 are held in engagement with the respective second engaging grooves 168, 190 which are formed in the second axial portion 70b, 70d of the clutch drum 70, in addition to the first engaging grooves 72 formed in the first axial portion 70a, 70c. Further, the second engaging teeth 188 of the flange 184 in the planetary gear device 180 are held in engagement with the respective cutouts 195 formed in the second axial portion 70d of the clutch drum 70. In these planetary gear devices 160, 180, the ring gears 162, 182 having the outwardly extending flanges 164, 184 functioning as the abutting members, and the clutch drum 70 have sufficiently high degree of durability and strength sufficient to withstand a torque acting thereon during their rotation.

In the planetary gear device 160, the axial movements of the one-piece member functioning as the ring gear 162 and the abutting member 164 are prevented by the snap ring 170 fixed on the inner circumferential surface of the second axial portion 70b of the clutch drum 70b, and the shoulder surface 172 defined by the first and second axial portions 70a, 70b of the clutch drum 70. In the planetary gear device 180, the axial movements of the one-piece member functioning as the ring gear 182 and the abutting member 184 are prevented by the snap ring 192 fixed on the inner circumferential surface of the second axial portion 70d of the clutch drum 70, and the abutting end faces 194 provided by the first axial portion 70a of the clutch drum 70.

While the preferred embodiments of the present invention have been described in detail by reference to the accompanying drawings, for illustrative purpose only, it is to be understood that the present invention is not limited to the details of the illustrated embodiment, but may be otherwise embodied.

Although the planetary gear devices of the illustrated embodiments are adapted for a front-drive automotive vehicle provided with the engine 12 and the continuously variable transmission 16, the planetary gear device of the present invention is equally applicable to an automotive vehicle of any other type, such as: a hybrid vehicle provided with the engine 12 and a motor/generator which is operated selectively as an electric motor and an electric generator; a vehicle which is provided with a transmission whose speed ratio is variable in steps, in place of the continuously variable transmission 16 whose speed ratio is continuously variable; and a four-wheel-drive vehicle.

While the illustrated planetary gear devices 14, 130, 150, 160, 180 are of single-pinion type, the principle of the present invention is equally applicable to a planetary gear device of double-pinion type.

Although the illustrated planetary gear devices 14, 130, 150, 160, 180 are provided as the forward/reverse switching device arranged to selectively drive the vehicle in the forward and reverse directions, the planetary gear device of the present invention may be arranged to change the ratio of speed reduction of a drive power source of an automotive vehicle.

In the planetary gear devices 150, 160, 180, the ring gear 152, 162, 182 and the abutting member 154, 164, 184 are formed integrally with each other, as a one-piece member. However, the outwardly extending flange formed separately from the ring gear may be welded to the ring gear so as to form a one-piece member.

It is to be understood that the present invention may be embodied with various other changes, modifications and improvements, which may occur to those skilled in the art, in the light of the technical teachings of the present invention which have been described.

What is claimed is:

1. A planetary gear device for an automotive vehicle, comprising (a) three rotary elements consisting of a sun gear, a carrier and a ring gear, (b) a clutch drum having a plurality of engaging grooves formed in its inner circumferential surface and parallel to its axial direction, (c) a plurality of friction members fitted in said engaging grooves of said clutch drum such that said friction members are rotatable with said clutch drum and axially movable relative to said clutch drum, each of said friction members having a plurality of engaging teeth formed on its outer circumferential surface and held in engagement with the respective engaging grooves of said clutch drum, (d) an abutting member having a plurality of engaging teeth formed on its outer circumferential surface, fixed in said clutch drum at said engaging teeth thereof and disposed on one side of a series of said friction members such that said abutting member is rotatable with said clutch drum and abuttable on a nearest one of said friction members, and (e) a piston slidably fitted in said clutch drum and disposed on the other side of said series of the friction members such that said piston is axially movable relative to said clutch drum, to press said friction members toward said abutting member, and wherein said ring gear has a plurality of engaging teeth formed on its outer circumferential surface, and fitted in said clutch drum at said engaging teeth thereof such that said ring gear is rotatable with said clutch drum, wherein an improvement comprises:

said abutting member and said ring gear being formed integrally with each other, as a one-piece member; and at least one retainer ring fixed on said clutch drum to prevent axial movements of said one-piece member relative to said clutch drum, said at least one retainer ring being disposed in contact with said engaging teeth of said abutting member and said ring gear.

2. A planetary gear device according to claim 1, wherein said at least one retainer ring is fixed on said inner circumferential surface of said clutch drum in which said plurality of engaging grooves are formed.

3. A planetary gear device according to claim 1, wherein said ring gear has an outwardly extending flange formed at one axial end thereof on the side of said clutch drum, and said abutting member is formed integrally with said outwardly extending flange such that said abutting member is spaced apart from said outwardly extending flange in an axial direction of said clutch drum, said at least one retainer ring consisting of a single retainer ring interposed between said outwardly extending flange and said abutting member.

4. A planetary gear device according to claim 1, wherein said one-piece member has a plurality of common engaging teeth which function as said engaging teeth of said abutting member and said engaging teeth of said ring gear, said at least one retainer ring including a retainer ring which is disposed on one side of a radially outer portion of said one-piece member which has said common engaging teeth, said one side being remote from said piston.

5. A planetary gear device according to claim 4, wherein said clutch drum includes a first axial portion having an inner circumferential surface in which said engaging grooves are formed as first engaging grooves, and a second axial portion having an inner circumferential surface in which a plurality of second engaging grooves are formed, said common engaging teeth being held in engagement with said second engaging grooves.

6. A planetary gear device according to claim 5, wherein said second axial portion has a larger diameter than said first axial portion and is located on one side of said first axial portion which is remote from said piston, said first and second axial portions cooperating with each other to define a shoulder surface, said at least one retainer ring consisting of a single retainer ring disposed on said one side of said radially outer portion of said one-piece member, said common engaging teeth being held in abutting contact with said shoulder surface.

7. A planetary gear device according to claim 5, wherein said first and second axial portions have a same diameter, and said second axial portion is located on one side of said first axial portion which is remote from said piston, said one-piece member having a plurality of second engaging teeth formed such that said common engaging teeth and said second engaging teeth are arranged alternately in a circumferential direction of said one-piece member, said second axial portion having a plurality of cutouts formed such that said second engaging teeth are held in engagement with said cutouts, respectively, said first axial portion having axial end faces which are exposed to said respective cutouts and which provide abutting faces, said at least one retainer ring consisting of a single retainer ring disposed on said one side of said radially outer portion of said one-piece member, said second engaging teeth being held in abutting contact with said abutting faces.

8. A planetary gear device according to claim 4, wherein said at least one retainer ring consists of said retainer ring disposed on said one side of said radially outer portion of said one-piece member, and an auxiliary stop member fixedly disposed on the other side of said radially outer portion of said one-piece member.

9. A planetary gear device according to claim 1, wherein said engaging teeth of said ring gear are held in direct engagement with said engaging grooves of said clutch drum.

* * * * *